United States Patent [19]
Walker et al.

[11] Patent Number: 5,289,722
[45] Date of Patent: Mar. 1, 1994

[54] PREASSEMBLED, EASILY MOUNTABLE STRAIN GAGE

[75] Inventors: Hugh S. Walker, Manhattan; Robert J. Dorgan, St. George, both of Kans.

[73] Assignee: Kansas State University Research Foundation, Manhattan, Kans.

[21] Appl. No.: 873,756

[22] Filed: Apr. 27, 1992

[51] Int. Cl.⁵ ............................... G01B 7/16
[52] U.S. Cl. ............................. 73/775; 33/DIG. 13
[58] Field of Search .............................. 73/775, 776; 33/DIG. 13

[56] References Cited

U.S. PATENT DOCUMENTS

| | | | |
|---|---|---|---|
| 2,350,073 | 5/1944 | Simmons, Jr. | |
| 2,386,879 | 10/1945 | Ostergren | 201/63 |
| 2,576,489 | 11/1951 | Stovall, Jr. | 175/41.5 |
| 2,626,337 | 1/1953 | Mitchell | |
| 2,626,338 | 1/1953 | Mitchell | |
| 2,899,658 | 8/1959 | Bean, Jr. | 338/2 |
| 2,927,878 | 3/1960 | Beckman | 154/90 |
| 2,963,773 | 12/1960 | Starr | 29/159.5 |
| 3,082,139 | 3/1963 | Clark | |
| 3,428,933 | 2/1969 | Gerstenberger | 338/2 |
| 3,433,699 | 3/1969 | Rumble | 156/580 |
| 3,475,712 | 10/1969 | Brown | 338/2 |
| 3,913,391 | 10/1975 | Kurtz | |
| 3,943,758 | 3/1976 | Wolf et al. | |
| 3,986,254 | 10/1976 | Nordstom | 29/613 |
| 4,050,976 | 9/1977 | Reiters | 156/233 |
| 4,897,927 | 2/1990 | Nicol | 33/534 |

FOREIGN PATENT DOCUMENTS 660397 4/1963 Canada .................. 73/775

OTHER PUBLICATIONS

Instruction Bulletin; Strain Gage Installations with M--Bond 200 Adhesive; No. B-217-10; Measurements Group, Inc. 1979.

*Primary Examiner*—Jerry W. Myracle
*Attorney, Agent, or Firm*—Hovey, Williams, Timmons & Collins

[57] ABSTRACT

A prefabricated, easily installable strain gage assembly (10) is provided which includes an elongated synthetic resin substrate (12) having adhesive (16) applied to the majority of one surface thereof while leaving a handling tab portion (18) adjacent one end of the substrate (12). A strain gage unit (28) is secured to the adhesive-bearing surface of substrate (12). A strippable protective film (56) is placed in covering, protective relationship to the strain gage (28) and the adhesive surface of substrate (12). Preferably, the substrate (12), adhesive (16) and film (56) are substantially transparent, and the substrate (12) is provided with perpendicular alignment marks (55, 55a) which are strategically located relative to the strain gage unit (28). A relatively long hold-down region (42) forming a part of the substrate (12) is provided between the handling tab portion (18) and strain gage unit (28), so that, upon initial visual alignment of the assembly (10) on a test surface (60), the film (56) may be partially removed to allow temporary adherence of the region (42) to the surface (62). This insures maintenance of the gage alignment and permits subsequent complete removal of film (56), application of bonding materials (68, 70, 72) to the strain gage unit (28) and surface (62), full lay-out of the substrate (12) on the surface (62), and subsequent substrate removal. Use of assemblies (10) in accordance with the invention drastically reduces strain gage installation times, and greatly minimizes inadvertent destruction of the gages owing to improper placement thereof.

32 Claims, 3 Drawing Sheets

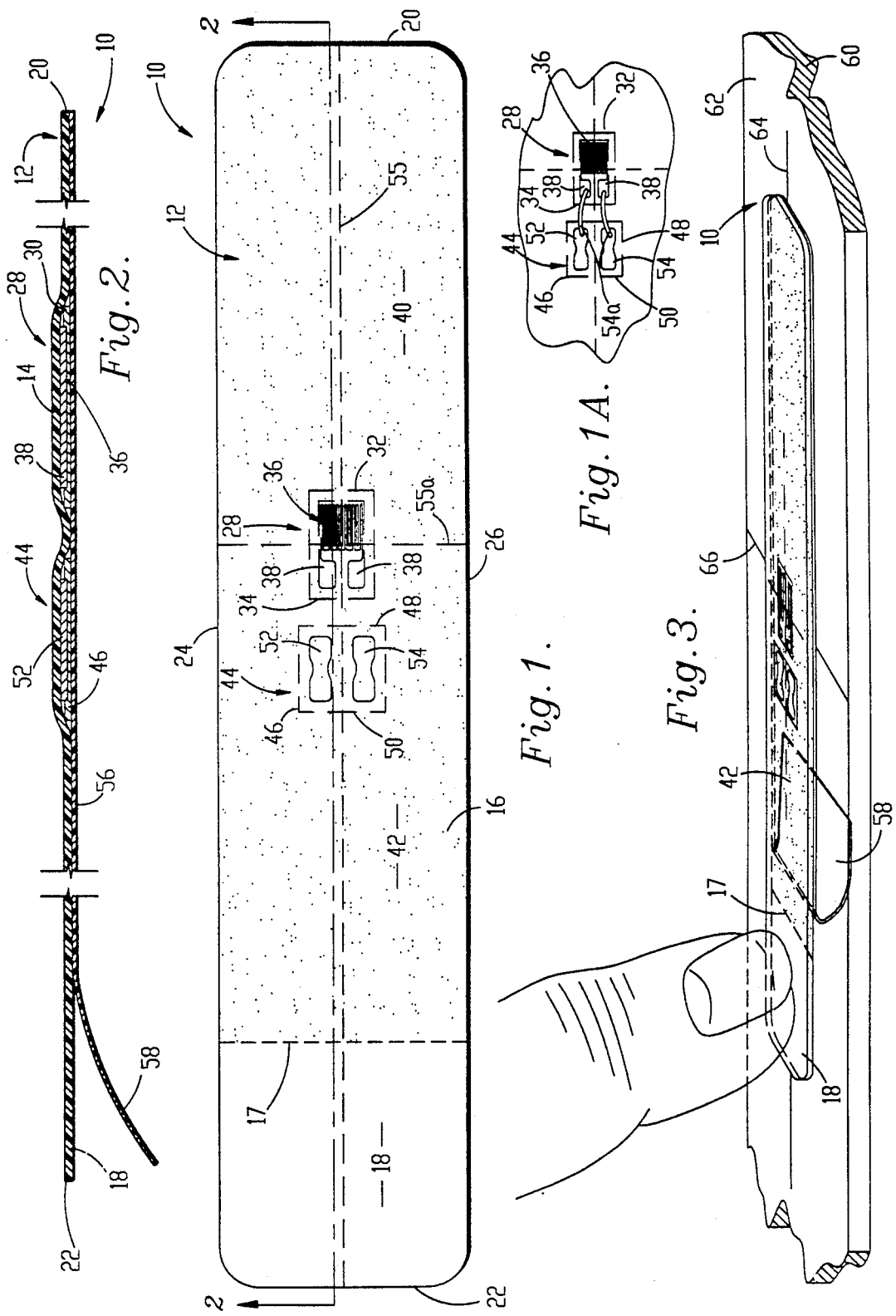

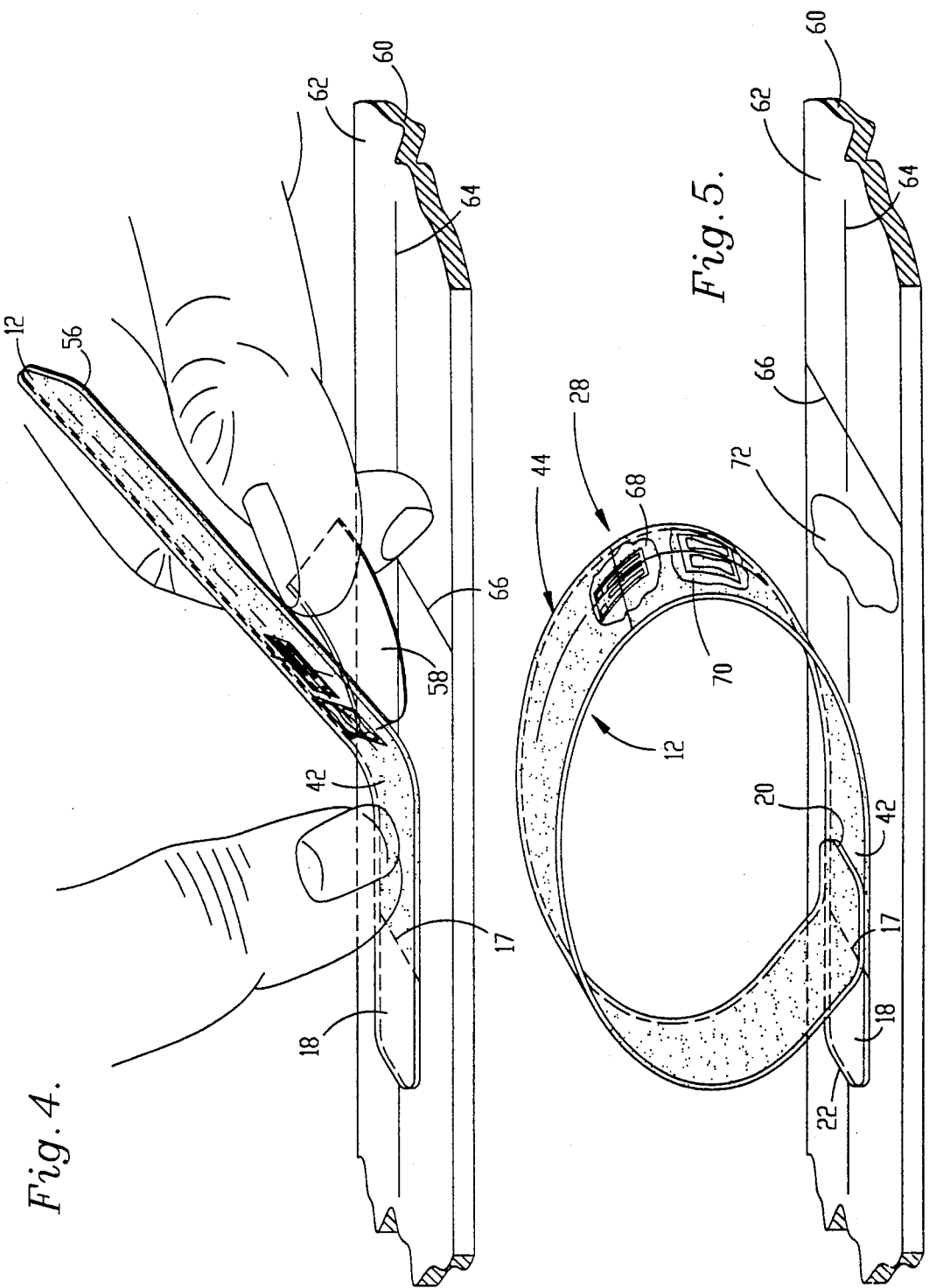

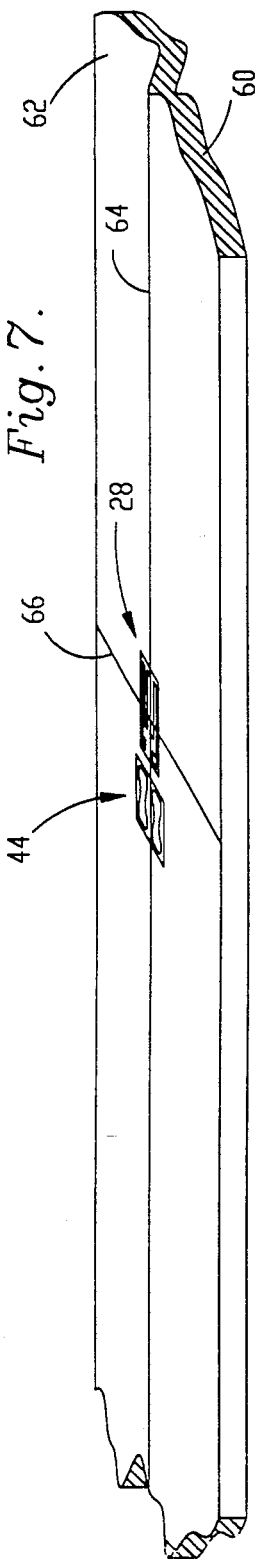
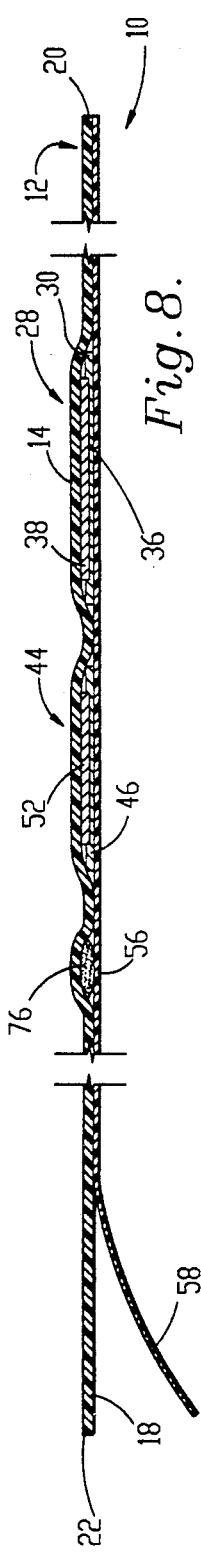
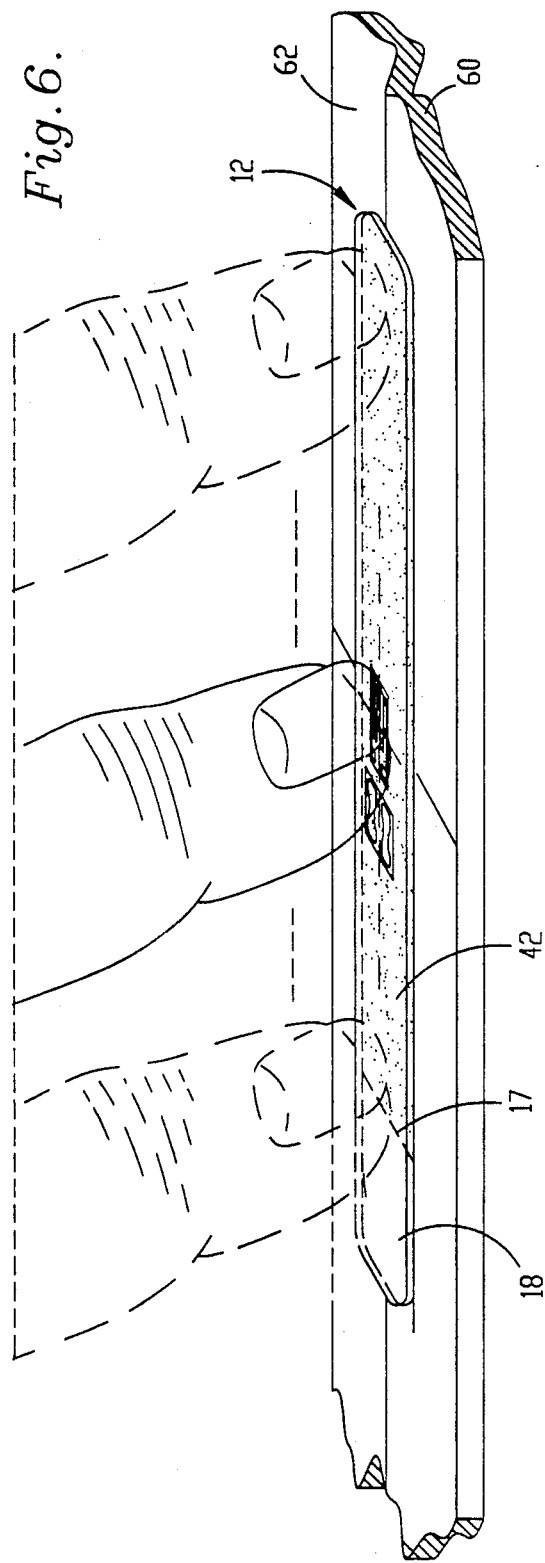
Fig. 6.
Fig. 7.
Fig. 8.

PREASSEMBLED, EASILY MOUNTABLE STRAIN GAGE

BACKGROUND OF THE INVENTION

1. Field of the Invention

The present invention is broadly concerned with improved, prefabricated strain gage apparatus for sensing surface conditions and strain in test bodies. More particularly, it is concerned with such strain gage devices which are especially designed to facilitate accurate alignment and attachment of relatively delicate electrical gage components onto a test surface while substantially lessening gage installation times and the incidence of gage destruction during such installations.

2. Description of the Prior Art

In the design, development and testing of many structural components such as airplane wings or the like, it is desirable to understand the deflection and strain which the component may undergo during use. In order to measure these forces, electrical resistance-type strain gages have long been employed, and are generally capable of providing accurate information, so long as they are properly and accurately applied to a test surface. Generally speaking, such strain gages are very delicate devices, formed with metallic foil grids having elongated, laterally spaced, series-connected grid elements and enlarged terminal regions. They are typically used in conjunction with a pair of spaced conductive metal tabs to which external leads may be attached.

In general, such strain gage and tab assemblies are individually packaged in small envelopes and sold in lots. In order to attach a strain gage/tab assembly to a test surface, a relatively complex series of time-consuming steps must generally be followed. First, the test surface is thoroughly cleaned and degreased. Then, tweezers are used to remove the gage and tab components from an envelope, and these are placed on a glass plate or gage box surface. A stretch of cellophane adhesive tape is then applied over the gage and tab assembly, taking care to center the gage on the tape. The tape is then carefully lifted at a shallow angle, bringing the gage and tab assembly up with the tape.

In the next step, the tape is applied onto the desired test surface, with an attempt being made to properly align the gage grid with the precise point on the test surface under consideration. As necessary, the tape is lifted and realigned until the most accurate possible orientation of the gage is achieved. At this point, one end of the tape is lifted from the test surface until the attached gage and tab assembly is free of the test surface; the free end of the tape is then tucked under so that the gage and tabs are supported on the tape above the test surface. Catalyst is then applied to the exposed gage and tab surfaces, while complementary adhesive is applied to the test surface along the juncture of the tape.

In the final attachment steps, the free end of tape is rotated back towards the test surface and, while holding the tape slightly taut, a wiping stroke is made over the outer surface of the tape. This serves to bring together the adhesive and catalyst and firmly bond the gage and tab to the test surface; this bonding is completed by thumb pressure over the gage and tab regions of the tape. Finally, the cellophane tape is pulled directly back over itself to slowly and steadily peel the tape off the test surface and bonded gage/tab assembly.

As can be appreciated, this installation procedure is time-consuming and requires considerable practice and skill to master. It is moreover very easy to improperly attach and/or destroy the delicate and expensive strain gage components during the course of an attempted installation. Indeed, it is estimated that as many as 20-30% of expensive strain gages are rendered useless by improper installation.

There is accordingly a real and unsatisfied need in the art for an improved strain gage assembly and installation method which overcomes the problems outlined above and materially decreases gage installation time while minimizing gage destruction owing to improper attachment techniques.

SUMMARY OF THE INVENTION

The present invention overcomes the problems outlined above and provides a greatly improved, prefabricated strain gage apparatus which can be installed in as little as 50% of the time normally associated with gage installation, and with greater accuracy.

Broadly speaking, the strain gage apparatus of the invention includes an elongated, flexible tape-type substrate having an adhesive applied to one surface thereof, with an electrical strain gage adhered to the one surface of the substrate intermediate the ends thereof. The substrate adhesive presents respectively forwardly and rearwardly extending axial hold-down regions from the corresponding forward and rearward margins of the strain gage. A selectively removable, protective film is applied over at least a portion of the adhesive surface of the substrate and covers and protects both the strain gage and hold-down regions. Very importantly, at least one of the hold-down regions has a length greater than the length of the strain gage and is sufficient for permitting initial positioning and temporary hold-down of the entire assembly on a test surface by removal of a portion of the film to reveal adhesive covering one of the hold-down regions, and pressing of the revealed adhesive against the test surface.

In particularly preferred forms, a handling tab section formed as an extension of the substrate is provided beyond one of the hold-down regions so that the hold-down region is located between the strain gage and handling tab section. The latter is free of adhesive, in order to facilitate initial manipulation and alignment of the strain gage assembly on a test surface. In addition, the substrate includes means defining locating indicia thereon, with this indicia being oriented in relation to the strain gage for accurate alignment of the latter. Advantageously, the substrate, adhesive and protective film are substantially transparent to permit viewing the strain gage, test surface and locating indicia therethrough.

In attachment operations, the locating indicia on the substrate is aligned with similar markings on the test surface, this being accomplished by manipulation of the entire assembly via the handling tab section. Thereupon, a portion of the protective film adjacent the handling tab section is removed to reveal the adjacent hold-down region, and the latter is adhered to the test surface. At this point, the remainder of the film can be removed from the substrate while the latter is retained on the test surface. Bonding means such as a catalyst/bonding agent are then conventionally applied to the strain gage and test surface, and the substrate is pressed onto the test surface. After curing of the bonding means, the substrate is stripped from the test surface and attached strain gage.

By virtue of the transparent nature of the substrate and protective film, as well as the locating indicia and provision of the temporary hold-down regions on the substrate, strain gage attachment can be readily accomplished, even by unskilled personnel.

BRIEF DESCRIPTION OF THE DRAWINGS

FIG. 1 is a greatly enlarged, plan view of a strain gage assembly in accordance with the present invention;

FIG. 1A is a fragmentary plan view similar to that of FIG. 1, but illustrating lead wires interconnecting the gage and tab assemblies;

FIG. 2 is a fragmentary sectional view of the strain gage assembly taken along line 2—2 of FIG. 1;

FIG. 3 is an enlarged perspective view illustrating an initial step of the strain gage installation method of the present invention;

FIG. 4 is a view similar to that of FIG. 3, but illustrating the next installation step whereupon a hold-down region of the substrate is adhesively secured to a test surface;

FIG. 5 is a view similar to that of FIG. 4, but showing the substrate, while still secured to the test surface via the hold-down region, turned back upon itself to expose the strain gage and tab, and with catalyst applied to the gage and tab;

FIG. 6 is a view similar to that of FIG. 5, but showing the substrate reapplied to the test surface during the final stages of gage installation;

FIG. 7 is a perspective view illustrating the gage and tab assembly secured to the test surface; and FIG. 8 is an enlarged, fragmentary vertical sectional view illustrating another embodiment in accordance with the invention wherein use is made of self-contained gage adhesive.

DETAILED DESCRIPTION OF THE PREFERRED EMBODIMENTS

Turning now to the drawings, and particularly FIGS. 1-2, a strain gage assembly 10 is illustrated. Broadly speaking, the assembly 10 includes a substrate 12 in the form of an elongated stretch of flexible synthetic resin (e.g., cellophane) tape 14 having adhesive 16 applied to the majority of the undersurface thereof and terminating in adhesive end line 17, as viewed in FIG. 2. The left-hand end portion 18 of substrate 12 is free of adhesive, as illustrated. Alternately, the portion 18 may be covered by a permanently attached web or the like (not shown) in order to render the portion adhesive-free. The substrate 12 presents a forward end 20, and opposed rearward end 22, and elongated side margins 24, 26 joining the ends 20, 22.

The overall assembly 10 further includes a strain gage unit 28 adhered to the adhesive-bearing surface of substrate 12 intermediate ends 20, 22 and in centered relationship to side margins 24, 26. The unit 28 includes a backing card 30 presenting spaced forward and rearward end edges 32, 34, together with a conventional, metallic foil grid array 36 and terminals 38 secured to card 30. It will further be observed that the strain gage unit 28 is oriented on substrate 12 so as to present respective forward and rearward hold-down regions 40, 42 on the substrate between edge 32 and end 20, and between edge 34 and adhesive end line 17. At least one of these regions, and preferably the rearward region 42, has an axial length greater than the axial length of the strain gage between ends 32, 34.

In particularly preferred forms, a connection tab unit 44 is also secured to the adhesive-bearing surface of substrate 12. The tab unit 44 likewise includes a base card 46 having spaced forward and rearward edges 48, 50, which support a pair of metallic connection tabs 52, 54. If desired, the prefabricated assembly 10 may include a pair of electrical leads 54a respectively connecting the terminals 38 and tabs 52, 54. Provision of these leads in the complete prefabricated assembly eliminates one installation step as will be explained. Again referring to the hold-down regions 40, 42, it is preferred to size these regions such that the axial lengths thereof, and particularly rearward region 42, is greater than the axial distance between rearward card edge 50 of tab unit 44 and forward card edge 32 of gage unit 28.

In preferred forms, the substrate 12 has locating or alignment indicia thereon serving to facilitate initial placement of the strain gage on a test surface. Thus, as best seen in FIG. 1, the substrate 12 includes a central, axially extending line 55, as well as a transversely extending line 55a, marked thereon. The lines 55, 55a, and particularly the intersection thereof, are strategically oriented relative to the attached strain gage unit 28 for proper alignment of the latter. Generally, and as shown in FIG. 1, line 55a traverses the free ends of the grid elements.

The assembly 10 is completed by provision of a selectively removable, synthetic resin protective film 56 (e.g., polyethylene) applied over the entirety of adhesive 16 in covering relationship to gage unit 28 and tab unit 44. As best seen in FIG. 2, the film 56 presents a free tail section 58 adjacent portion 18 of substrate 12, where the latter is not adhesively coated. The film 56 may be progressively stripped from the adhesive-bearing portion of substrate 12 by grasping tail 58 and pulling the film.

Preferably, substrate 12, adhesive 16 and film 56 are essentially transparent, whereas the alignment marks 55, 55a, are imprinted as bold black lines on the substrate. In this way, the user can readily sight through the prefabricated assembly, thus greatly facilitating initial alignment of the strain gage unit 28. Additionally, the electrical parameters of the strain gage (e.g., resistance and/or capacitance) may also be printed on the substrate so that there is no question about the type of strain gage being applied.

FIG. 8 illustrates another embodiment in accordance with the invention wherein the assembly 10 includes a small, elongated, frangible, ampule or container 76 having a supply of bonding agent therein. In this form, the container 76 is positioned rearwardly of tab unit 44 in the region 42, and is adhered to the substrate 12. In addition, the gage unit 28 and tab unit 44 have catalyst applied thereto which reacts with the bonding agent within container 76.

The use of assembly 10 will next be described with reference to a schematically illustrated test body 60 presenting an uppermost test surface 62 (see FIG. 3). The surface 62 is cleaned and prepared using conventional techniques and materials, and is moreover marked with intersecting lines 64, 66 so as to locate on the surface 62 the exact location where a strain gage should be applied.

In the first application step, the user grasps assembly 10 via the non-adhesive portion 18 and manipulates the prefabricated assembly until the lines 55, 55a are aligned with corresponding lines 64, 66 on surface 62. At this point, the user presses downwardly on the portion 18 of substrate 12 to hold the assembly 10 in place, and tail portion 58 of film 56 is pulled upwardly to expose a portion of the adhesive 16, and specifically the holddown region 42 between line 17 and tab rear edge 50. While this stripping operation continues, the user presses the adhesive-bearing region 42 of substrate 12 into contact with the surface 62 so as to adhesively secure the entire assembly 10 in place. This operation is shown in FIGS. 3 and 4. It will of course be understood that, by virtue of the initial alignment of the assembly via lines 55, 55a, and the subsequent temporary attachment of the assembly by adhering portion 42 to surface 62, essentially exact alignment of the strain gage unit 28 relative to the lines 64, 66 on the test surface is maintained.

In the next step (see FIG. 5), the film 56 is completely removed from substrate 12, and the latter is folded back upon itself to present a loop. For this purpose, the extreme forward end of the substrate 12 may be temporarily adhered to the upper surface of the rearward end of the substrate. At the same time, however, care is taken to insure that the adhesion between holddown region 42 and surface 62 remains intact.

The user then applies bond means to the strain gage unit 28, tab unit 44 and surface 66. Advantageously, appropriate amounts of catalyst 68, 70 are applied to the exposed surfaces of the units 28 and 44, wherein a portion of bonding agent 72 is applied to surface 62 rearwardly of the intersection between lines 64, 66.

At this point, the forward end of substrate 12 is loosened and the substrate is applied to surface 62 as best seen in FIG. 6. This is done by holding the forward end of the substrate 12 taut and using hand pressure in a wiping motion across the top of the substrate to spread the adhesive 72 and cause the latter to contact the catalyst 68, 70. Depending upon the nature of the bonding means employed, further finger pressure directed against the units 28 and 44 may be required to effect a complete and secure bond.

The last step in the installation procedure involves simply stripping the substrate 12 from surface 62, leaving the units 28, 44 secured in place in accurate alignment with lines 64 66. Thereupon, appropriate electrical connections are made between the units 28, 44 and external leads are welded or otherwise affixed to the tabs 52, 54.

The use of the assembly depicted in FIG. 8 differs slightly from that described above, and specifically in connection with the application of catalyst and bonding agent. In particular, in the FIG. 8 embodiment wherein the units 28 and 44 are precoated with catalyst, and a frangible container 76 of bonding agent is provided, is only necessary to initially position the assembly as described, whereupon the film 56 can be completely removed. At this point, finger pressure is used as described in reference to FIG. 6, which has the effect of first breaking container 76 and then spreading the bonding agent forwardly until proper contact is made with the precoated catalyst on the units 28 and 44. After the bonding system cures, the substrate 12 can then be stripped from the strain gage components.

Obviously, if the assembly 10 includes electrical leads 54a as illustrated in FIG. 1A, the step of electrically connecting the gage and tab units 28, 44 can also be omitted. In that case, it is only necessary to secure external leads to the tabs 52, 54.

What is claimed is:

1. Prefabricated strain gage apparatus comprising:

an elongated, flexible substrate presenting first and second opposed ends and laterally spaced apart side margins joining said ends, said substrate having adhesive applied to one surface thereof;

an electrical strain gage presenting spaced forward and rearward margins defining the length thereof and releasably adhered to said one surface of said substrate intermediate the ends of said substrate, said adhesive being present on said substrate for respective forwardly and rearwardly extending axial lengths from the corresponding forward and rearward margins of said strain gage to define forward and rearward hold-down regions; and a selectively removable, protective film applied over at least a portion of said one surface of said substrate and covering said strain gage and hold-down regions, in protective relationship to the strain gage and hold-down regions, both of said regions having a length greater than the length of said strain gage and being sufficient for permitting initial positioning and temporary holddown of said assembly on a test surface by removal of a portion of said film to reveal adhesive covering said one region, and pressing of said revealed adhesive against said test surface, said region lengths also being sufficient for partial detachment of said apparatus for said test surface after said initial positioning to expose said gage, with one of the hold down regions remaining adhered to the test surface and the other region separated from the test surface, and for repositioning and securement of the gage in the same location as said initial position after adhesive application to one of said exposed gage and test surface, said substrate being strippable from said repositioned and secured gate.

2. A prefabricated strain gage apparatus as set forth in claim I, including a handling tab section forming an extension of said substrate beyond said one region with said region being between said strain gage and handling tab section, said section being free of adhesive.

3. A prefabricated strain gage apparatus as set forth in claim I, including means defining locating indicia on said substrate, said indicia being oriented relative to said strain gage for accurate alignment of the strain gage on a test surface.

4. A prefabricated strain gage apparatus as set forth in claim 3, said indicia including axially and laterally extending alignment marks respectively oriented along and perpendicular to the longitudinal axis of said substrate.

5. A prefabricated strain gage apparatus as set forth in claim 3, said substrate and film being substantially transparent to permit viewing of said strain gage and a test surface therethrough.

6. A prefabricated strain gage apparatus as set forth in claim including electrical tab means spaced from said strain gage and releasably adhered to said one surface of said substrate in alignment with said strain gage.

7. A prefabricated strain gage apparatus as set forth in claim 6, said tab means presenting forward and rearward margins with said forward margin being adjacent to said strain gage, the total axial length from the rearward margin of said tab means to the forward margin of said strain gage being less than the length of said one region.

8. A prefabricated strain gage apparatus as set forth in claim 6, including respective electrical leads interconnecting said strain gage and tab means.

9. A prefabricated strain gage apparatus as set forth in claim 1, including a frangible container holding a supply of adhesive means, said container being adhered to said substrate, said film covering said container.

10. A prefabricated strain gage apparatus, consisting essentially of:
- an elongated, flexible substrate presenting first and second opposed ends and laterally spaced apart side margins joining said ends, said substrate having pressure-sensitive adhesive applied to one surface thereof;
- an electrical strain gage presenting spaced forward and rearward margins defining the length thereof and releasably adhered to said one surface of said flexible substrate intermediate the ends of said substrate,
- said pressure-sensitive adhesive being present on said substrate for respective forwardly and rearwardly extending axial lengths from the corresponding forward and rearward margins of said strain gage to define forward and rearward hold-down regions; and
- a selectively removable, flexible protective film applied over at least a portion of said one surface of said substrate and covering said strain gage and hold-down regions, in protective relationship to the strain gage and hold-down regions,
- said gage being sandwiched between said one surface of said flexible substrate and said flexible protective film and in direct contact with both said flexible substrate and said flexible protective film,
- said flexible substrate being strippable from said gage after attachment of the gage to a test surface.

11. A prefabricated strain gage apparatus as set forth in claim 10, including a handling tab section forming an extension of said substrate adjacent one end thereof, said section being free of adhesive.

12. A prefabricated strain gage apparatus as set forth in claim 10, including means defining locating indicia on said substrate, said indicia being oriented relative to said strain gage for accurate alignment of the strain gage on a test surface.

13. A prefabricated strain gage apparatus as set forth in claim 12, said indicia including axially and laterally extending alignment marks respectively oriented along and perpendicular to the longitudinal axis of said substrate.

14. A prefabricated strain gage apparatus as set forth in claim 12, said substrate and film being substantially transparent to permit viewing of said strain gage and a test surface therethrough.

15. A prefabricated strain gage apparatus as set forth in claim 10, including electrical tab means spaced from said strain gage and releasably adhered to said one surface of said substrate in alignment with said strain gage.

16. A prefabricated strain gage apparatus as set forth in claim 15, including respective electrical leads interconnecting said strain gauge and tab means.

17. A prefabricated strain gage apparatus as set forth in claim 10, including a frangible container holding a supply of adhesive means, said container being adhered to said substrate, said film covering said container.

18. A prefabricated strain gage apparatus comprising:
- an elongated, flexible substrate presenting first and second opposed ends and laterally spaced apart side margins joining said ends, said substrate having adhesive applied to one surface thereof;
- an electrical strain gage presenting spaced forward and rearward margins defining the length thereof and releasably adhered to said one surface of said substrate intermediate the ends of said substrate,
- said adhesive being present on said substrate for respective forwardly and rearwardly extending axial lengths from the corresponding forward and rearward margins of said strain gage to define forward and rearward hold-down regions;
- a selectively removable, protective film applied over at least a portion of said one surface of said substrate and covering said strain gage and hold-down regions, in protective relationship to the strain gage and hold-down regions;
- means defining locating indicia on said substrate, said indicia being oriented relative to said strain gage for accurate alignment of the strain gage on a test surface; and
- a frangible container holding a supply of adhesive means, said container being adhered to said substrate, said film covering said container.

19. A prefabricated strain gage apparatus as set forth in claim 18, said indicia including axially and laterally extending alignment marks respectively oriented along and perpendicular to the longitudinal axis of said substrate.

20. A prefabricated strain gage apparatus as set forth in claim 18, said substrate and film being substantially transparent to permit viewing of said strain gage and a test surface therethrough.

21. A prefabricated strain gage apparatus as set forth in claim 18, including electrical tab means spaced from said strain gage and releasably adhered to said one surface of said substrate in alignment with said strain gage.

22. A prefabricated strain gage apparatus as set forth in claim 21, including respective electrical leads interconnecting said strain and tab means.

23. A prefabricated strain gage apparatus comprising:
- an elongated, flexible substrate presenting first and second opposed ends and laterally spaced apart side margins joining said ends, said substrate having adhesive applied to one surface thereof;
- an electrical strain gage presenting spaced forward and rearward margins defining the length thereof and releasably adhered to said one surface of said substrate intermediate the ends of said substrate,
- said adhesive being present on said substrate for respective forwardly and rearwardly extending axial lengths from the corresponding forward and rearward margins of said strain gage;
- a selectively removable, protective film applied over at least a portion of said one surface of said substrate and covering said strain gage and adhesive; and
- a handling tab section forming an extension of said substrate adjacent one end thereof, said section being free of adhesive.

24. A method of attaching a strain gage to a test surface, comprising the steps of:
- providing a strain gage assembly comprising an elongated substrate having adhesive applied to one surface thereof, a strain gage releasably secured to said one surface intermediate the ends of the substrate, and a selectively removable protective film applied in covering relationship over said strain gage and one surface of said substrate;

removing a portion of said film adjacent one end of said substrate to reveal an adhesive-bearing temporary hold-down region;

adhering said hold-down region to said test surface for temporarily holding said assembly on the test surface;

removing the remainder of said film from said substrate while maintaining said assembly temporarily held on the test surface;

applying bonding means to one of said strain gage and test surface;

adhering the remainder of said adhesive-bearing substrate surface to said test surface, and causing said bonding means to attach said strain gage to said test surface; and removing said substrate while leaving said strain gage attached to said test surface.

25. The method as set forth in claim 24, including the step of applying catalyst to said strain gage, and applying adhesive bond to said test surface.

26. The method as set forth in claim 24, including the step of initially orienting said strain gage relative to said test surface using locating indicia on the surface of said substrate remote from said adhesive.

27. The method as set forth in claim 24, wherein at least a portion of said bonding means is maintained within a frangible container adhered to said substrate, said applying step including the steps of breaking said container to release said bonding means portion.

28. Prefabricated strain gage apparatus comprising:
an elongated, flexible substrate presenting first and second opposed ends and laterally spaced apart side margins joining said ends, said substrate having adhesive applied to one surface thereof;
an electrical strain gate presenting spaced forward and rearward margins defining the length thereof and releasably adhered to said one surface of said substrate intermediate the ends of said substrate,
said adhesive being present on said substrate for respective forwardly and rearwardly extending axial lengths from the corresponding forward and rearward margins of said strain gage to define forward and rearward hold-down regions;
a selectively removable, protective film applied over at least a portion of said one surface of said substrate and covering said strain gage and hold-down regions, in protective relationship to the strain gage and hold-down regions,
at least one of said regions having a length greater than the length of said strain gage and being sufficient for permitting initial positioning and temporary hold-down of said assembly on a test surface by removal of a portion of said film to reveal adhesive covering said one region, and pressing of said revealed adhesive against said test surface; and
a handling tab section forming an extension of said substrate beyond said one region with said one region being between said strain gate and handling tab section, said section being free of adhesive.

29. Prefabricated strain gage apparatus comprising:
an elongated, flexible substrate presenting first and second opposed ends and laterally spaced apart side margins joining said ends, said substrate having adhesive applied to one surface thereof;
an electrical strain gage presenting spaced forward and rearward margins defining the length thereof and releasably adhered to said one surface of said substrate intermediate the ends of said substrate;
electrical tab means spaced from said strain gate and releasably adhered to said one surface of said substrate in alignment with said strain gage, said tab means presenting forward and rearward margins with said forward tab means margin being adjacent to said rearward margin of said strain gage,
said adhesive being present on said substrate for respective forwardly and rearwardly extending axial lengths from the corresponding forward and rearward margins of said strain gage and tab means respectively to define forward and rearward hold-down regions;
a selectively removable, protective film applied over at least a portion of said one surface of said substrate and covering said strain gage and hold-down regions, in protective relationship to the strain gage and hold-down regions,
at least one of said regions having a length greater than the total axial length from the rearward margin of said tab means to the forward margin of said strain gage for permitting initial positioning and temporary hold-down of said assembly on a test surface by removal of a portion of said film to reveal adhesive covering said one region, and pressing of said revealed adhesive against said test surface.

30. Prefabricated strain gage apparatus comprising:
an elongated, flexible substrate presenting first and second opposed ends and laterally spaced apart side margins joining said ends, said substrate having adhesive applied to one surface thereof;
an electrical strain gage presenting spaced forward and rearward margins defining the length thereof and releasably adhered to said one surface of said substrate intermediate the ends of said substrate,
said adhesive being present on said substrate for respective forwardly and rearwardly extending axial lengths from the corresponding forward and rearward margins of said strain gage to define forward and rearward hold-down regions;
a selectively removable, protective film applied over at least a portion of said one surface of said substrate and covering said strain gage and hold-down regions, in protective relationship to the strain gage and hold-down regions,
at least one of said regions having a length greater than the length of said strain gage and being sufficient for permitting initial positioning and temporary hold-down of said assembly on a test surface by removal of a portion of said film to reveal adhesive covering said one region, and pressing of said revealed adhesive against said test surface; and
a frangible container holding a supply of adhesive means, said container being adhered to said substrate, said film covering said container.

31. A prefabricated strain gage apparatus, consisting essentially of:
an elongated, flexible substrate presenting first and second opposed ends and laterally spaced apart side margins joining said ends, said substrate having adhesive applied to one surface thereof;
an electrical strain gage presenting spaced forward and rearward margins defining the length thereof and releasably adhered to said one surface of said substrate intermediate the ends of said substrate, p1 said adhesive being present on said substrate for respective forwardly and rearwardly extending axial lengths from the corresponding forward and rearward margins of said strain gage to define forward and rearward hold-down regions;

a selectively removable, protective film applied over at least a portion of said one surface of said substrate and covering said strain gage and hold-down regions, in protective relationship to the strain gage and hold-down regions; and a handling tab section forming an extension of said substrate adjacent one end thereof, said section being free of adhesive.

32. A prefabricated strain gage apparatus, consisting essentially of:

an elongated, flexible substrate presenting first and second opposed ends and laterally spaced apart side margins joining said ends, said substrate having adhesive applied to one surface thereof;

an electrical strain gage presenting spaced forward and rearward margins defining the length thereof and releasably adhered to said one surface of said substrate intermediate the ends of said substrate, said adhesive being present on said substrate for respective forwardly and rearwardly extending axial lengths from the corresponding forward and rearward margins of said strain gage to define forward and rearward hold-down regions;

a selectively removable, protective film applied over at least a portion of said one surface of said substrate and covering said strain gage and hold-down regions, in protective relationship to the strain gage and hold-down regions; and a frangible container holding a supply of adhesive means, said container being adhered to said substrate, said film covering said container.

* * * * *